(12) United States Patent
Kodama

(10) Patent No.: US 10,279,632 B2
(45) Date of Patent: May 7, 2019

(54) PNEUMATIC RADIAL TIRE FOR AGRICULTURAL VEHICLE

(71) Applicant: BRIDGESTONE CORPORATION, Tokyo (JP)

(72) Inventor: Takashi Kodama, Setagaya-ku (JP)

(73) Assignee: BRIDGESTONE CORPORATION, Tokyo (JP)

( * ) Notice: Subject to any disclaimer, the term of this patent is extended or adjusted under 35 U.S.C. 154(b) by 715 days.

(21) Appl. No.: 14/889,877

(22) PCT Filed: Apr. 18, 2014

(86) PCT No.: PCT/JP2014/002215
§ 371 (c)(1),
(2) Date: Nov. 9, 2015

(87) PCT Pub. No.: WO2014/192218
PCT Pub. Date: Dec. 4, 2014

(65) Prior Publication Data
US 2016/0068025 A1  Mar. 10, 2016

(30) Foreign Application Priority Data
May 28, 2013  (JP) ................................. 2013-112140

(51) Int. Cl.
*B60C 11/11* (2006.01)
*B60C 11/13* (2006.01)
*B60C 11/03* (2006.01)

(52) U.S. Cl.
CPC ....... *B60C 11/0316* (2013.01); *B60C 11/0311* (2013.01); *B60C 11/0327* (2013.01);
(Continued)

(58) Field of Classification Search
CPC ............. B60C 11/0311; B60C 11/1307; B60C 11/0316; B60C 2011/1338; B60C 2011/0313
See application file for complete search history.

(56) References Cited

U.S. PATENT DOCUMENTS 5,733,394 A * 3/1998 Baus ................... B60C 11/0311
152/208

FOREIGN PATENT DOCUMENTS

JP  03-035601 Y2 *  7/1991
JP  04-081306 A     3/1992
(Continued)

OTHER PUBLICATIONS

Machine translation for Japan 2008-024270 (Year: 2018).*
(Continued)

*Primary Examiner* — Steven D Maki
(74) *Attorney, Agent, or Firm* — Sughrue Mion, PLLC

(57) ABSTRACT

This pneumatic radial tire for agricultural vehicles includes lugs arranged alternately, in the tread circumferential direction, in tread width direction halves, and at least one protrusion on a wall at a trailing edge side of each lug, protruding from the wall in an opposite direction from a designated tire rotation direction, connecting to the bottom of a lug groove, and including an upper face orthogonal to the tire radial direction. A line M connects a tread width direction innermost point P of the wall at the trailing edge side of a first lug and a point Q ⅓ of a peripheral length of the wall away. The protrusion of a second lug positioned on the opposite tread width direction half from the first lug and adjacent to the first lug in the designated tire rotation direction is positioned on the tread width direction inner side of the line M.

4 Claims, 4 Drawing Sheets

(52) U.S. Cl.
CPC ... *B60C 11/1307* (2013.01); *B60C 2011/0313* (2013.01); *B60C 2011/1338* (2013.01); *B60C 2200/08* (2013.01)

(56)　　　　　References Cited

FOREIGN PATENT DOCUMENTS

| | | | |
|---|---|---|---|
| JP | 04-183601 A | | 6/1992 |
| JP | 06-320915 A | * | 11/1994 |
| JP | 07-001903 A | * | 1/1995 |
| JP | 2001-354011 A | | 12/2001 |
| JP | 2005-162026 A | | 6/2005 |
| JP | 2006-273052 A | | 10/2006 |
| JP | 2007-245822 A | | 9/2007 |
| JP | 2008-024270 A | * | 2/2008 |
| JP | 2008-24270 A | | 2/2008 |
| JP | 4854414 B2 | | 1/2012 |
| JP | 2013-6515 A | | 1/2013 |

OTHER PUBLICATIONS

Machine translation for Japan 07-001903 (Year: 2018).*
Machine translation for Japan 06-320915 (Year: 2018).*
Machine translation for Japan 03-035601 Y2 (Year: 2018).*
Notification of Reason for Refusal for Japanese Patent Application No. 2013-112140, dated Jun. 24, 2014.
International Search Report of PCT/JP2014/002215, dated Jul. 1, 2014. [PCT/ISA/210].

* cited by examiner

PNEUMATIC RADIAL TIRE FOR AGRICULTURAL VEHICLE

CROSS REFERENCE TO RELATED APPLICATIONS

This application is a National Stage of International Application No. PCT/JP2014/002215 filed Apr. 18, 2014, claiming priority based on Japanese Patent Application No. 2013-112140, filed May 28, 2013, the contents of all of which are incorporated herein by reference in their entirety.

TECHNICAL FIELD

This disclosure relates to a pneumatic radial tire for agricultural vehicles.

BACKGROUND

Conventionally, as illustrated in FIG. 1(a), it has been proposed to provide a radial pneumatic tire for agricultural vehicles with lugs 92, on a tread surface 91, extending in a designated tire rotation direction from a tread edge TE towards the tread width direction inner side, the lugs 92 being arranged alternately in the tread circumferential direction in tread width direction halves divided by the tire equatorial plane CL (for example, see JP 2006-273052 A (PTL 1)). As illustrated in FIG. 1(b), in a tire circumferential direction cross-section, the lugs 92 have a shape that protrudes outward in the tire radial direction, with a wall 92b at the trailing edge side being steeper than a wall 92a at the leading edge side. In such a tire, the traction performance is ensured by the lugs 92 scratching soil, in agricultural fields and the like, when being driven. Furthermore, low-compaction lugs 92 are used so as not to damage the agricultural fields.

However, the environment of use of agricultural vehicles, such as tractors, is becoming faster, as seen by changes to standards in Europe and the USA. As a result, since the frequency of driving on public roads is increasing, there is a demand for measures to address problems of vibration due to increased speed. Therefore, one method of reducing the energy input from the road surface is a tendency to use the pattern illustrated in FIG. 2, in which the lugs 92 are disposed on the tread surface 91 so that when a first lug 92 in one of the tread width direction halves is projected in the tread circumferential direction, the first lug 92 overlaps a second lug 92 in the other tread width direction half near the tire equatorial plane CL. In such a pattern, the interval in the tread circumferential direction between lugs becomes narrow near the tire equatorial plane CL, thereby reducing the vibration input when driving at high speed.

CITATION LIST

Patent Literature

PTL 1: JP 2006-273052 A

SUMMARY

Technical Problem

In a tire with the lug pattern illustrated in FIGS. 1(a) and 2, however, the amount of work from wear increases at the trailing edge side, where the braking force is large, and the amount of work from wear at the leading edge side decreases. Therefore, the tire more easily slips at the trailing edge side, causing wear to progress and leading to uneven wear between the trailing edge side and the leading edge side.

In particular, in the pattern illustrated in FIG. 2, the interval in the tread circumferential direction between the lugs 92 is narrow. Hence when the tire rotates, as illustrated in FIG. 3, the lug 94 is dragged, via the groove bottom of the lug groove, by the crushing deformation of the lug 93 that contacted the ground previously (deformation whereby the lug 93 expands in the tire circumferential direction and the tire width direction due to being compressed in the tire radial direction by the load), thereby promoting the braking force and causing the above-described uneven wear to worsen.

It would therefore be helpful to provide a pneumatic radial tire for agricultural vehicles that has excellent uneven wear resistance.

Solution to Problem

I thoroughly investigated how to solve the above problems. As a result, I discovered that providing a protrusion with a predetermined shape on the wall at the trailing side of the lug allows for suppression of the above-described dragging of a lug by crushing deformation of another lug adjacent in the tread circumferential direction.

A summary of this disclosure is as follows. This pneumatic radial tire for agricultural vehicles has a designated tire rotation direction and includes: a plurality of lugs, on a tread surface, extending from a tread width direction outer side towards a tread width direction inner side at an inclination in the designated tire rotation direction, the lugs being arranged alternately, in a tread circumferential direction, in tread width direction halves divided by a tire equatorial plane; and at least one protrusion on a wall at a trailing edge side of each lug, protruding from the wall in an opposite direction from the designated tire rotation direction, connecting to a groove bottom of a lug groove that defines the lug, and including an upper face orthogonal to a tire radial direction, wherein a point P is a tread width direction innermost point of the wall at the trailing edge side of a first lug among the plurality of lugs, a point Q is located along a periphery of the wall at the trailing edge side of the first lug away from the point P by ⅓ of a peripheral length of the wall, and a line M connects the point P and the point Q, and a line M connects the point P and the point Q, and the protrusion of a second lug that is positioned in a tread width direction half on an opposite side from the first lug and is adjacent to the first lug in the designated tire rotation direction is positioned on the tread width direction inner side of the line M. As used here, "orthogonal to a tire radial direction" refers to the angle, in a tire circumferential direction cross-section, between the upper face of the protrusion and a plane orthogonal to the tire radial direction being 20° or less. The "peripheral length" refers to the peripheral length when the tire is mounted on an applicable rim with standard pressure applied and no load applied.

Advantageous Effect

I thus provide a pneumatic radial tire for agricultural vehicles with excellent uneven wear resistance.

Figure 2:
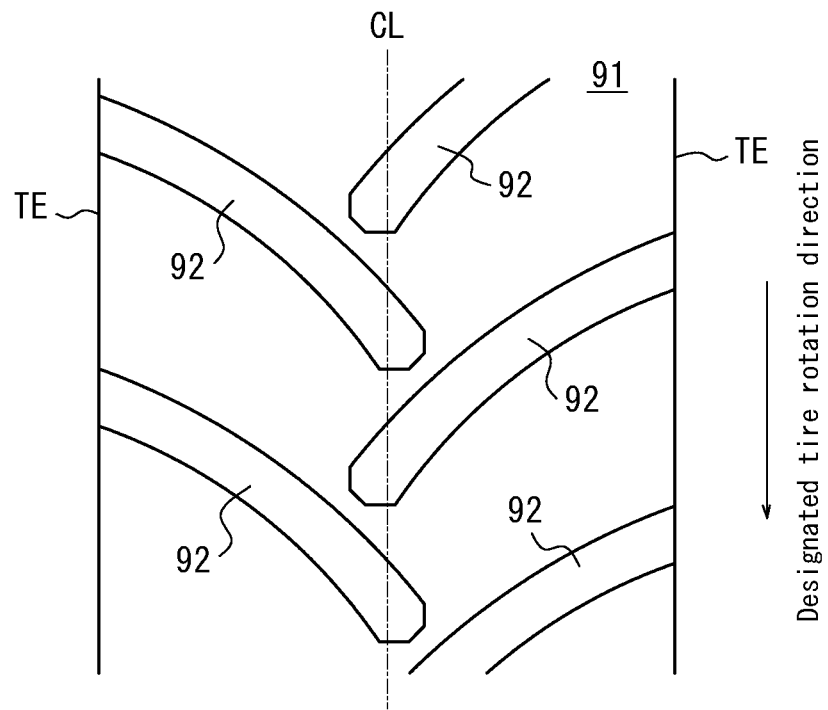
Figure 3:
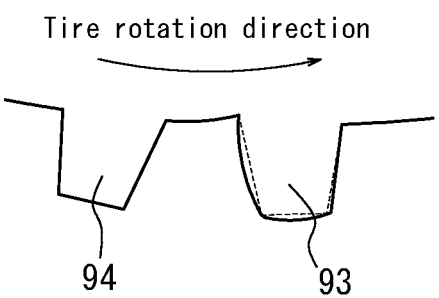
Figure 4:
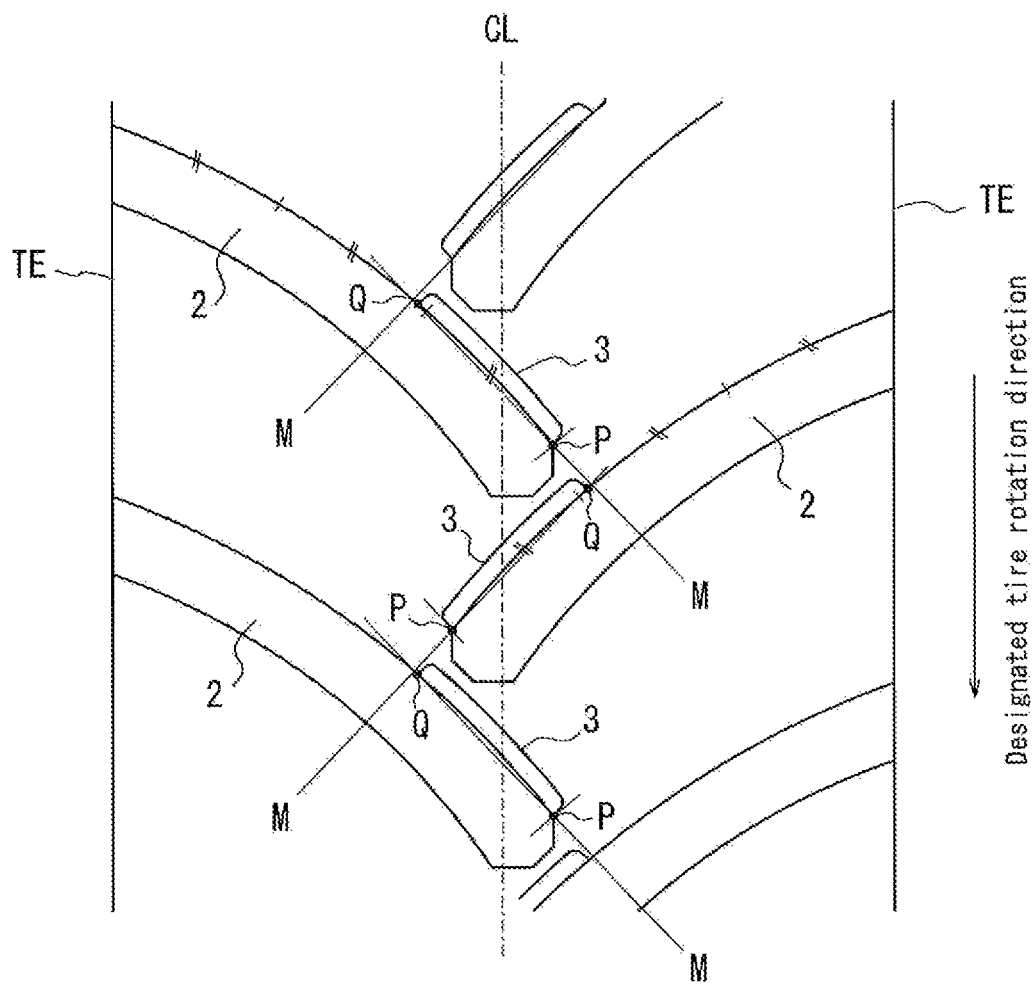
Figure 5A:
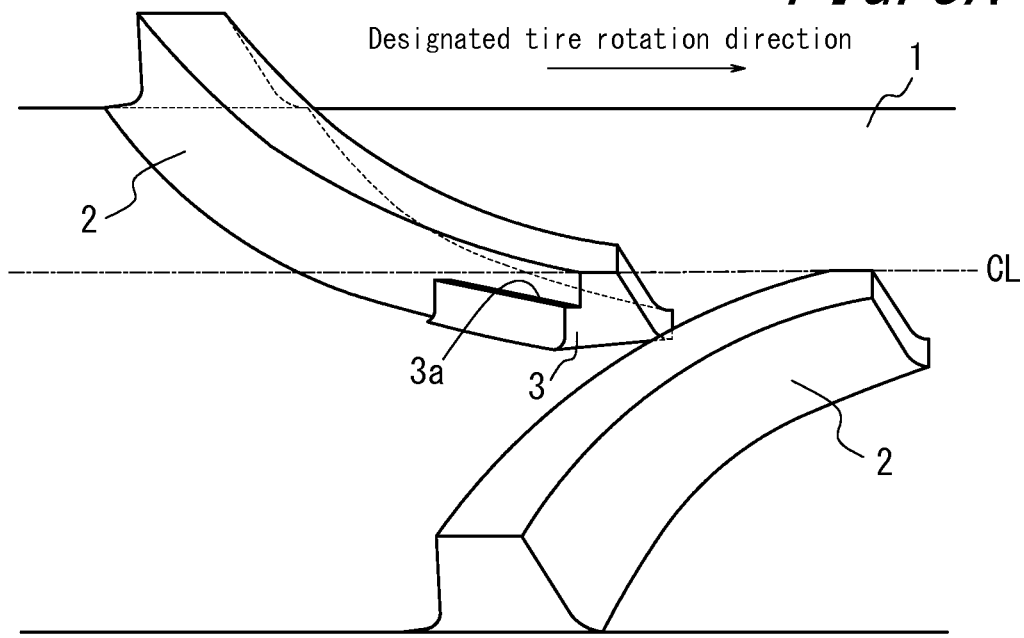
Figure 5B:
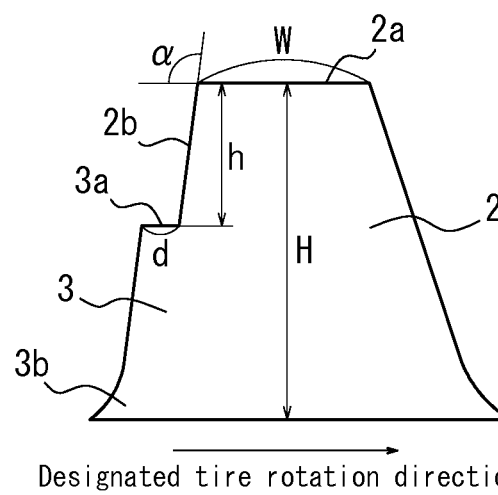
Figure 6:
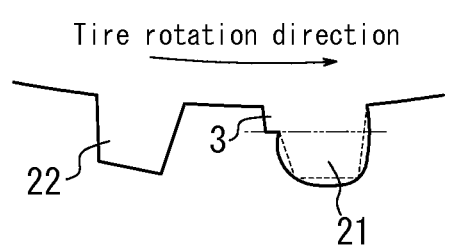

illustrates the cross-sectional shape in the tire circumferential direction of conventional lugs;

FIG. 2 illustrates the lug pattern of a conventional pneumatic radial tire for agricultural vehicles;

FIG. 3 illustrates the mechanism by which uneven wear occurs;

FIG. 4 illustrates the lug pattern of a pneumatic radial tire for agricultural vehicles according to one of the disclosed embodiments;

FIG. 5(a) is a partial perspective diagram of the lug pattern of a pneumatic radial tire for agricultural vehicles according to one of the disclosed embodiments, and FIG. 5(b) illustrates the cross-sectional shape in the tire circumferential direction of the lug and protrusion of this disclosure; and FIG. 6 illustrates the effects of this disclosure.

DETAILED DESCRIPTION

With reference to the drawings, the following describes examples of the disclosed pneumatic radial tire for agricultural vehicles (also referred to as a tire) in detail. The internal structure of the tire is similar to that of a conventional tire, and thus a description thereof is omitted.

FIG. 4 illustrates the lug pattern of a pneumatic radial tire for agricultural vehicles according to one of the disclosed embodiments. As illustrated in FIG. 4, the rotation direction of the tire is designated for this tire. The direction indicated by the arrow in FIG. 4 is the designated tire rotation direction. As illustrated in FIG. 4, this tire has a plurality of lugs 2 on the tread surface 1. In the illustrated example, each lug 2 extends from the tread width direction outer side (the tread edge TE in the illustrated example) towards the tread width direction inner side at an inclination in the designated tire rotation direction, and the lugs 2 are arranged alternately in tread width direction halves divided by the tire equatorial plane CL. In the illustrated example, the inclination angle of the lugs 2 with respect to the tread circumferential direction gradually decreases from the tread width direction outer side (tread edge TE side) towards the tread width direction inner side.

Furthermore, as illustrated in FIG. 4, the lugs 2 are disposed so that when a first lug 2 in one of the tread width direction halves is projected in the tread circumferential direction, the first lug 2 overlaps a second lug 2 in the other tread width direction half near the tire equatorial plane CL. In the example illustrated in FIG. 4, lugs 2 that are adjacent in the tread circumferential direction are disposed so as to overlap when projected in the tread circumferential direction, yet the disclosed tires are not limited to this case. For example, lugs 2 that extend from the tread edge TE of one tread width direction half and end within that tread width direction half and lugs 2 that extend from the tread edge TE of the other tread width direction half and end within the other tread width direction half may be disposed alternately in the tread circumferential direction, with lugs 2 that are adjacent in the tread circumferential direction being disposed so as not to overlap when projected in the tread circumferential direction. In the case that lugs 2 that are adjacent in the tread circumferential direction overlap when projected in the tread circumferential direction, the overlap width in the tread width direction is preferably more than 0% to 30% or less of the tread width TW. Setting the overlap width to be more than 0% reduces pattern vibration by having the lugs continuously contact the ground when the tire rotates. On the other hand, setting the overlap width to be 30% or less allows for soil to be enclosed between the lugs when driving in agricultural fields and guarantees traction with the repulsive force generated by pressing soil at the leading surface of the lug. Note that the "tread width TW" refers to the maximum width in the tire width direction of the ground contact surface when the tire is mounted on an applicable rim, with specified air pressure and a load corresponding to the maximum load capability applied. An "applicable rim" refers to a rim specified by valid industrial standards for the region in which the tire is produced and used, such as the "JATMA (Japan Automobile Tyre Manufacturers Association) Year Book" in Japan, the "ETRTO (European Tyre and Rim Technical Organisation) Standard Manual" in Europe, and the "TRA (Tire and Rim Association, Inc.) Year Book" in the United States of America. The "specified internal pressure" refers to air pressure (maximum air pressure) corresponding to the tire maximum load capability under JATMA standards or the like for a tire of applicable size when the tire is mounted on an applicable rim. The "maximum load capability" refers to the maximum mass that the tire is allowed to bear according to the above JATMA standards or the like.

As illustrated in FIG. 4, this tire has at least one protrusion 3 (one on each lug 2 in the illustrated example) on the wall at the trailing edge side of each lug 2, protruding from the wall in an opposite direction from the designated tire rotation direction. FIG. 5(a) is a partial perspective diagram illustrating the lug pattern of the tire in this embodiment, and FIG. 5(b) illustrates the cross-sectional shape in the tire circumferential direction of the lug 2 and protrusion 3. As illustrated in FIGS. 5(a) and 5(b), the protrusion 3 connects to the groove bottom of the lug groove that defines the lug 2 and includes an upper face 3a orthogonal to the tire radial direction. As illustrated in FIGS. 5(a) and 5(b), in this embodiment, the protrusion 3 is formed as a step in a tire circumferential direction cross-section. In the illustrated example, the height from the upper face 2a of the lug 2 to the upper face 3a of the protrusion 3 is h (mm) and the protrusion width at the position of the upper face 3a is d (mm). Furthermore, in the illustrated example, the protrusion width gradually increases towards the groove bottom of the lug groove at a connecting portion 3b between the protrusion 3 and the groove bottom of the lug groove. The following describes the effects of the tire according to this embodiment.

When rotating, with respect to the lug 21 that contacts the ground first, the tire of this embodiment mainly causes crushing deformation to occur at a position on the tire radial direction outer side of the portion where the protrusion 3 is provided (at a position on the tire radial direction outer side of the position indicated by the line with alternating long and two short dashes in FIG. 5) and suppresses deformation from occurring at the protrusion 3 that protrudes toward the trailing edge side of the lug 2 and connects to the groove bottom of the lug groove that defines the lug 2, as illustrated in FIG. 6. Hence, it is possible to prevent the lug 22 that is connected via the lug groove bottom and that contacts the ground next from being dragged by deformation of the lug 21, which would promote the braking force. Accordingly, the disclosed tire has improved uneven wear resistance.

As illustrated in FIG. 4, a point P is the tread width direction innermost point of the wall at the trailing edge side of a first lug 2 among the plurality of lugs 2, a point Q is located along the periphery of the wall at the trailing edge side of the first lug 2 away from the point P by ⅓ of the peripheral length of the wall, and a line M connects the point P and the point Q. In the tire of this embodiment, as illustrated in FIG. 4, the protrusion 3 of a second lug 2 that is adjacent to the first lug 2 on the leading edge side of the first lug 2 is positioned on the tread width direction inner side of the line M.

The reason is that with this configuration, the interval in the tread circumferential direction between lugs 2 becomes narrow, and near the tread width direction central region, where uneven wear easily occurs, the above-described effect of suppressing a lug from being dragged by deformation of a lug that contacted the ground previously, which would promote the braking force, is achieved. The uneven wear resistance can thus be improved efficiently.

As illustrated in FIG. 5(b), the relationship $0.3 \leq h/H \leq 0.7$ is preferably satisfied, where H (mm) is the height of the lug 2, and h (mm) is the height from the upper face 2a of the lug 2 to the upper face 3a of the protrusion 3. If the ratio h/H is less than 0.3, then the distance between the upper face 2 of the lug 2 and the upper face 3a of the protrusion 3 is too short, and the entire lug 2 including the protrusion 3 might undergo crushing deformation. Conversely, if the ratio h/H exceeds 0.7, then the protrusion 3 becomes too small, and the effect gained by providing the protrusion 3 might not be sufficiently achieved. Therefore, by setting the ratio h/H to be in the above range, the uneven wear resistance can be even further enhanced.

Furthermore, as illustrated in FIG. 5(b), the relationship $0.03 \leq d/W \leq 0.25$ is preferably satisfied, where W (mm) is the width of the lug 2, and d (mm) is the protrusion width of the upper face 3a of the protrusion 3. Setting the ratio d/W to be 0.03 or more sufficiently guarantees the protrusion width at the position of the upper face 3a of the protrusion 3, thereby improving the uneven wear resistance. On the other hand, setting the ratio d/W to be 0.25 or less prevents the rigidity of the protrusion from increasing excessively and the rigidity of the lug from reducing excessively as compared to the protrusion, thereby preventing the steering stability from degrading when driving on paved roads (hard roads).

As illustrated in FIG. 5(b), the wall 2b of the lug 2 connecting the upper face 2a of the lug 2 and the protrusion 3 is preferably inclined in the designated tire rotation direction from the tire radial direction inner side to the tire radial direction outer side. In other words, as illustrated in FIG. 5(b), the angle α of the wall 2b of the lug 2 with respect to the upper face 2a of the lug 2 preferably exceeds 90°. The reason is that this configuration suppresses the concentration of stress, when a load is applied, at the portion where the protrusion and the wall of the lug intersect and suppresses the occurrence of a crack.

In the tires of the embodiments illustrated in FIGS. 4, 5(a), and 5(b), one protrusion 3 is provided on each lug 2, yet a plurality of protrusions 3 may be provided on each lug 2.

Furthermore, the ratio W/H of the width W (mm) of the lug 2 to the height H (mm) of the lug 2 is preferably 50% or more. The reason is that setting the ratio W/H to 50% or more guarantees the rigidity of the lug and guarantees the steering stability when driving on paved roads (hard roads).

The height H of the lug 2 is preferably 25 mm to 80 mm, and the width W of the lug 2 is preferably 20 mm to 75 mm. When the width W varies in the extending direction, the "width W of the lug" refers to the average width in the extending direction. Furthermore, when viewed in either of the halves in the tread width direction, the lugs 2 are preferably disposed at intervals of 50 mm to 400 mm in the tread circumferential direction. The inclination angle of the lug 2 with respect to the tread circumferential direction is preferably 20° to 60°. The inclination angle refers to the angle between the tread circumferential direction and a line connecting the tread width direction endpoints of the lug.

EXAMPLES

In order to confirm the effects of this disclosure, tires as Examples 1 to 11 in which the lugs were provided with a predetermined protrusion, a tire as a Comparative Example, in which the lugs did not include a protrusion, and a tire as a Reference Example, in which the position of the protrusion was on the outer side of the line M, were prepared. The following test to evaluate the uneven wear resistance was then performed. The specifications of each tire are listed in Table 1 below. In Table 1, stating that the "position of the protrusion" is "on the inner side (outer side) of the line M" means that when a point P is the tread width direction innermost point of the wall at the trailing edge side of a first lug, a point Q is located along the periphery of the wall at the trailing edge side of the first lug away from the point P by ⅓ of the peripheral length of the wall, and a line M connects the point P and the point Q, then the protrusion of a second lug that is positioned in the tread width direction half on the opposite side from the first lug and is adjacent to the first lug in the designated tire rotation direction is positioned on the tread width direction inner side (outer side) of the line M. The ratio W/H is 80% for each tire. Details on the evaluation of uneven wear resistance are as follows.

<Uneven Wear Resistance>

The shear force in the braking direction and the wear energy were measured when each of the above tires, with a tire size of 340/85R24, was assembled onto a rim with a rim size of 12×24 (conforming to ETRTO, TRA), internal pressure of 160 kPa was applied, a load of 1653 kgf (16199.4 N) was applied, and the tire was mounted on the front wheel and driven. An indexed evaluation was made with a relative value, taking the shear force in the braking direction and the wear energy of the tire of the Comparative Example to be 100. In Table 1, a smaller value indicates that the shear force in the braking direction and the wear energy are smaller, indicating better uneven wear resistance. Table 1 below lists the tire specifications and the evaluation results.

TABLE 1

|  | Example 1 | Reference Example | Example 2 | Example 3 | Example 4 | Example 5 | Example 6 |
|---|---|---|---|---|---|---|---|
| Lug pattern | FIG. 4 | — | FIG. 4 | FIG. 4 | FIG. 4 | FIG. 4 | FIG. 4 |
| Lug shape | FIG. 5(b) | FIG. 5(b) | FIG. 5(b) | FIG. 5(b) | FIG. 5(b) | FIG. 5(b) | FIG. 5(b) |
| Protrusion provided | yes | yes | yes | yes | yes | yes | yes |
| Position of protrusion | Inner side of line M | Outer side of line M | Inner side of line M | Inner side of line M | Inner side of line M | Inner side of line M | Inner side of line M |

TABLE 1-continued

|  | | | | | | |
|---|---|---|---|---|---|---|
| Ratio h/H (%) | 15 | 15 | 30 | 50 | 70 | 80 | 50 |
| Ratio d/W (%) | 10 | 10 | 10 | 10 | 10 | 10 | 2 |
| Inclination angle α of lug wall | 110° | 110° | 110° | 110° | 110° | 110° | 110° |
| Shear force in braking direction (INDEX) | 92 | 97 | 53 | 31 | 41 | 60 | 90 |
| Wear work (INDEX) | 96 | 98 | 63 | 42 | 56 | 70 | 91 |

Figure 1A:
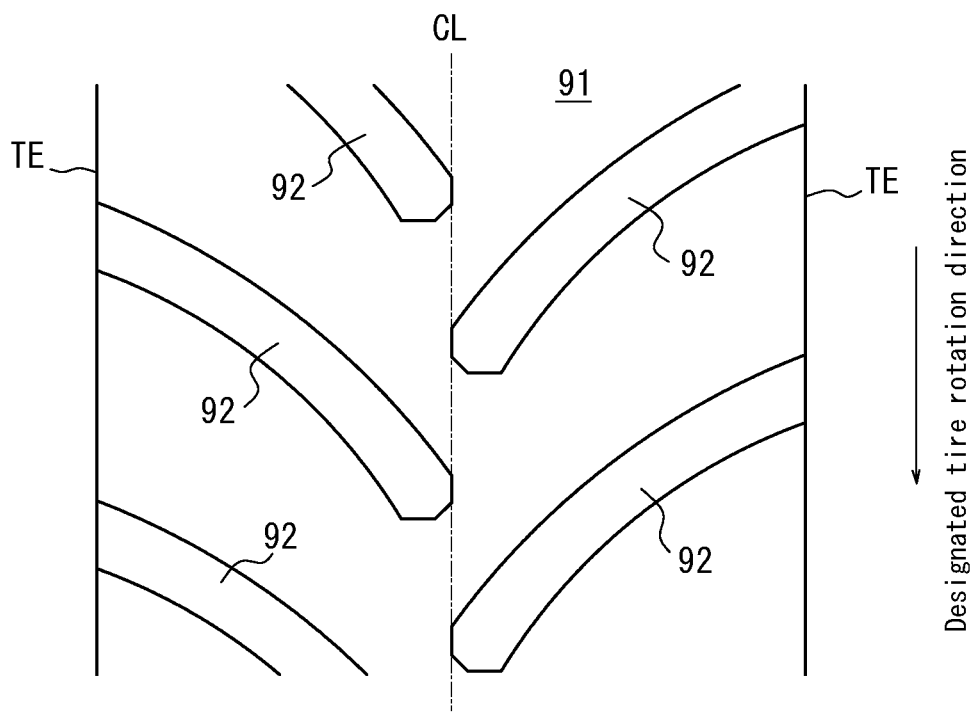
FIG. 1(a) illustrates the lug pattern of a conventional pneumatic radial tire for agricultural vehicles, and FIG. 1(b)
Figure 1B:
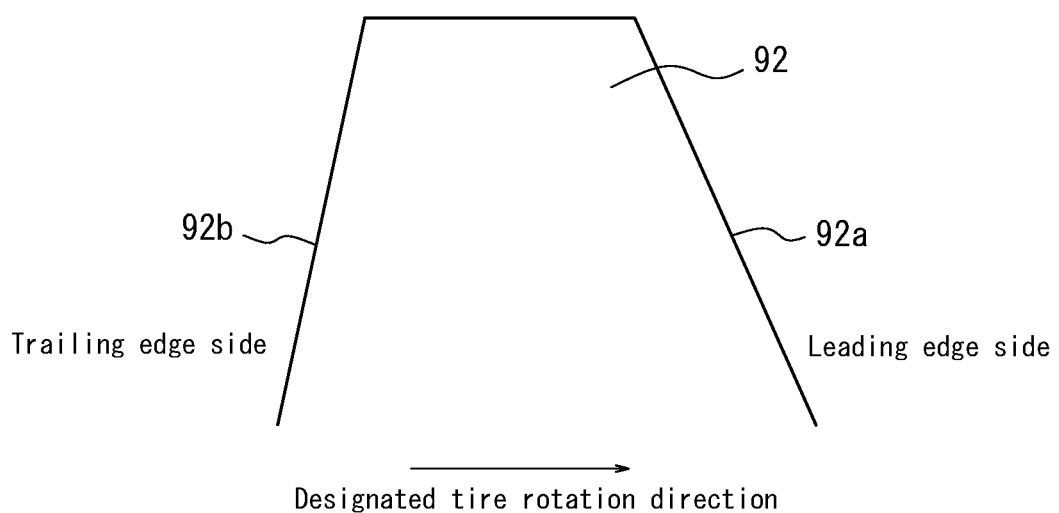

|  | Example 7 | Example 8 | Example 9 | Example 10 | Example 11 | Comparative Example |
|---|---|---|---|---|---|---|
| Lug pattern | FIG. 4 | FIG. 4 | FIG. 4 | FIG. 4 | FIG. 4 | FIG. 2 |
| Lug shape | FIG. 5(b) | FIG. 5(b) | FIG. 5(b) | FIG. 5(b) | — | FIG. 1(b) |
| Protrusion provided | yes | yes | yes | yes | yes | no |
| Position of protrusion | Inner side of line M | Inner side of line M | Inner side of line M | Inner side of line M | Inner side of line M | — |
| Ratio h/H (%) | 50 | 50 | 50 | 50 | 15 | — |
| Ratio d/W (%) | 3 | 5 | 15 | 20 | 10 | — |
| Inclination angle α of lug wall | 110° | 110° | 110° | 110° | 80° | — |
| Shear force in braking direction (INDEX) | 83 | 48 | 34 | 45 | 96 | 100 |
| Wear work (INDEX) | 86 | 58 | 44 | 53 | 97 | 100 |

As Table 1 shows, the tires of Examples 1 to 11 all have better uneven wear resistance than the tires of the Comparative Example. Table 1 also shows that Example 1, in which the position of the protrusion was optimized, has better uneven wear resistance than the Reference Example. Furthermore, Examples 2 to 4, for which the ratio h/H was optimized, clearly have better uneven wear resistance than Examples 1 and 5. Moreover, Examples 3 to 10, for which the ratio d/W was optimized, clearly have better uneven wear resistance than Example 6.

INDUSTRIAL APPLICABILITY

I thus provide a pneumatic radial tire for agricultural vehicles with excellent uneven wear resistance.

REFERENCE SIGNS LIST

1 Tread surface
2 Lug
3 Protrusion
91 Tread surface
92 Lug
CL Tire equatorial plane
TE Tread edge

The invention claimed is:

1. A pneumatic radial tire for agricultural vehicles that has a designated tire rotation direction, the tire comprising:
   a plurality of lugs, on a tread surface, extending from a tread width direction outer side towards a tread width direction inner side at an inclination in the designated tire rotation direction, the lugs being arranged alternately, in a tread circumferential direction, in tread width direction halves divided by a tire equatorial plane; and
   at least one protrusion on a wall at a trailing edge side of each lug, protruding from the wall in an opposite direction from the designated tire rotation direction, connecting to a groove bottom of a lug groove that defines the lug, and including an upper face orthogonal to a tire radial direction, wherein
   a point P is a tread width direction innermost point of the wall at the trailing edge side of a first lug among the plurality of lugs, a point Q is located along a periphery of the wall at the trailing edge side of the first lug away from the point P by ⅓ of a peripheral length of the wall, and a line M connects the point P and the point Q,
   the protrusion of a second lug that is positioned in a tread width direction half on an opposite side from the first lug and is adjacent to the first lug in the designated tire rotation direction is positioned only on the tread width direction inner side of the line M, and
   wherein $0.3 \leq h/H \leq 0.7$, where H (mm) is a height of the lug, and h (mm) is a height from an upper face of the lug to the upper face of the protrusion.

2. The pneumatic radial tire for agricultural vehicles of claim 1, wherein $0.03 \leq d/W \leq 0.25$, where W (mm) is a width of the lug, and d (mm) is a protrusion width of the upper face of the protrusion.

3. The pneumatic radial tire for agricultural vehicles of claim 1, wherein the wall of the lug connecting the upper face of the lug and the protrusion is inclined in the designated tire rotation direction from a tire radial direction inner side to a tire radial direction outer side.

4. The pneumatic radial tire for agricultural vehicles of claim 1, wherein a ratio W/H is 50% or more, where H is a height of the lug, and W is a width of the lug.

* * * * *